(12) United States Patent
Barouni Ebrahimi et al.

(10) Patent No.: US 10,496,706 B2
(45) Date of Patent: Dec. 3, 2019

(54) MATCHING STRINGS IN A LARGE RELATIONAL DATABASE

(71) Applicant: International Business Machines Corporation, Armonk, NY (US)

(72) Inventors: Mohammadreza Barouni Ebrahimi, Ottawa (CA); Samaneh Bayat, Ottawa (CA); Obidul Islam, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 15/488,612

(22) Filed: Apr. 17, 2017

(65) Prior Publication Data

US 2018/0300429 A1    Oct. 18, 2018

(51) Int. Cl.
    *G06F 16/903*    (2019.01)
    *G06F 16/33*     (2019.01)
    *G06F 16/901*    (2019.01)

(52) U.S. Cl.
    CPC .... *G06F 16/90344* (2019.01); *G06F 16/3347* (2019.01); *G06F 16/9014* (2019.01)

(58) Field of Classification Search
    CPC ............... G06F 16/2255; G06F 16/325; G06F 16/2228; G06F 16/316; G06F 16/3331; G06F 16/9014; G06F 16/90344
    See application file for complete search history.

(56) References Cited

U.S. PATENT DOCUMENTS

| | | | |
|---|---|---|---|
| 6,226,640 B1 | 5/2001 | Ostrovsky et al. | |
| 7,010,522 B1 | 3/2006 | Jagadish et al. | |
| 8,219,550 B2 | 7/2012 | Merz et al. | |
| 8,661,341 B1 | 2/2014 | Van Dijk | |
| 9,430,567 B2 | 8/2016 | Kondratova et al. | |
| 2016/0188619 A1* | 6/2016 | Su | G06F 16/3322 707/728 |

FOREIGN PATENT DOCUMENTS

CN       104035949       9/2014

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Boris Gorney
*Assistant Examiner* — Bao G Tran
(74) *Attorney, Agent, or Firm* — Law Office of Jim Boice

(57) ABSTRACT

A computer-implemented method searches a database for a particular string. One or more processors receive data as an input string, and then identify multiple k-grams in, unique characters in, and a length of the input string. The one or more processors perform binary locality sensitive hashing on the k-grams, the unique characters, and the length for the input string, and then sum the binary locality sensitive hashings to create a first addition vector, which is used to generate a first binary vector. The same process is performed on a particular string being requested to generate a second binary vector. The one or more processors then search the database for the particular string that was requested using the second binary vector in a large scale hamming distance query process that determines a hamming distance between the first binary code and the second binary code.

17 Claims, 10 Drawing Sheets

(56) References Cited

OTHER PUBLICATIONS

Liu et al., "Large Scale Hamming Distance Query Processing". IEEE, Proceedings of the ICDE Conference, 2011, pp. 553-564.

Moses Charikar, "Similarity Estimation Techniques From Rounding Algorithms". STOC 2002 Proceedings of the 34th Annual ACM Symposium on Theory of Computing, pp. 380-388.

Brew et al., "Word-Pair Extraction for Lexicography". Proceedings of the 2nd International Conference on New Methods in Language Processing, 1996, pp. 45-55.

Grzegorz Kondrak, "N-Gram Similarity and Distance". Springer-Verlag Berlin Heidelberg 2005, SPIRE 2005, LNCS 3772, pp. 115-126.

Ling et al., "Double-Phase Locality Sensitive Hashing of Neighborhood Development for Multi-Relational Data". IEEE, Proceedings of the 13th UK Workshop on Computational Intelligence (UKCI), Sep. 9-11, 2013.

Anonymous, "Efficiently find binary strings with low Hamming distance in large set". Stack Exchange Inc., 2016, Stackoverflow.com, Web Sep. 2, 2016. <http://stackoverflow.com/questions/6389841/efficiently-find-binary-strings-with-low-hamming-distance-in-large-set>.

Haifeng Hu, "Hamming distance based approximate similarity text search algorithm". IEEE, Proceedings of the Seventh International Conference on Advanced Computational Intelligence (ICACI), Mar. 27-29, 2015.

Zhang et al., "Binary Code Ranking with Weighted Hamming Distance". Proceedings / CVPR, IEEE Computer Society Conference on Computer Vision and Pattern Recognition. IEEE Computer Society Conference on Computer Vision and Pattern Recognition, Jun. 2013.

\* cited by examiner

MATCHING STRINGS IN A LARGE RELATIONAL DATABASE

BACKGROUND

The present invention relates to the field of computers, and particularly to computers that are capable of storing and retrieving data from relational databases. Still more particularly, the present invention relates to matching strings in a large relational database.

SUMMARY

In a computer-implemented method embodiment of the present invention, one or more processors receive data as an input string. The processor(s) generate a first binary code using a binary locality sensitive hashing of the input string, where features used to generate the first binary code include a similarity coefficient of strings of characters in the input string, unique characters of the input string, and a length of the input string. The processor(s) then store the first binary code and the input string in a database. In response to receiving a search request for a particular string, the processor(s) generate a second binary code using the binary locality sensitive hashing on the particular string, and then search the database using the second binary code in a large scale hamming distance query process. The processor(s) rank and return a set of similar strings, where strings with a minimum hamming distance between the first binary code and second binary code are a highest ranked recommendation.

In another computer-implemented method embodiment of the present invention, one or more processors search a database for a particular string. One or more processors receive data as an input string, and then identify multiple k-grams in, unique characters in, and a length of the input string. The one or more processors perform binary locality sensitive hashing on the k-grams, the unique characters, and the length for the input string, and then sum the binary locality sensitive hashings on the k-grams, the unique characters, and the length of the input string to create a first addition vector. The one or more processors then generate a first binary vector from the first addition vector, where each element in the first binary vector represents a binary state of a value found in the first addition vector. The one or more processors then store the first binary vector and the input string in a database. The one or more processors then, upon receipt of a search request for a particular string in a database, identify multiple k-grams in, unique characters in, and a length of the particular string. The one or more processors then perform binary locality sensitive hashing on the k-grams, the unique characters, and the length for the particular string, and then sum the binary locality sensitive hashings on the k-grams, the unique characters, and the length of the particular string to create a second addition vector, which is used to generate a second binary vector, wherein each element in the second binary vector represents a binary state of a value found in the second addition vector. The one or more processors then search the database for the particular string that was requested using the second binary vector in a large scale hamming distance query process that determines a hamming distance between the first binary code and the second binary code. The one or more processors then return the particular string based on the hamming distance between the first binary code and the second binary code.

Other embodiments of the present invention include a computer system and a computer program product.

DETAILED DESCRIPTION

Figure 1:
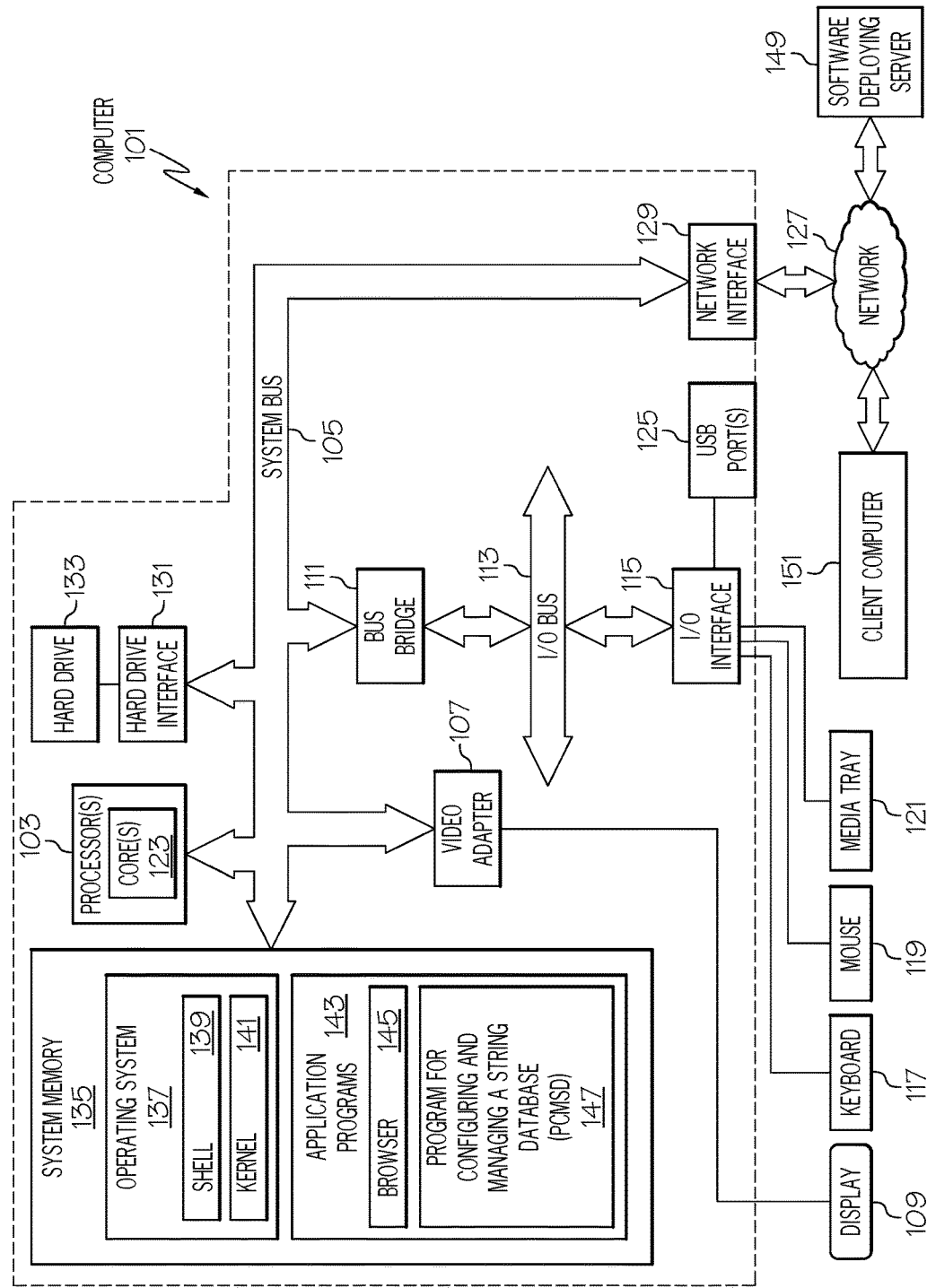
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. Some or all of the exemplary architecture, including both depicted hardware and software, shown for and within computer 101 can be utilized by: software deploying server 149 and/or client computer 151 shown in FIG. 1.

With further reference to FIG. 1, exemplary computer 101 includes processor(s) 103, operably coupled to a system bus 105. Processor(s) 103 may embody or use one or more processor core(s) 123. A video adapter 107, which drives/supports a display 109, is also coupled to system bus 105. In one or more embodiments of the present invention, video adapter 107 detects (e.g., using inputs from keyboard 117 and/or mouse 119) that a user has paused, stopped, rewound, or otherwise interrupted the play of a video being shown on display 109.

System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or client computer 151 via network interface 129 and network 127. Network 127 may include (without limitation) one or more external networks—such as a wide area network (WAN), and/or a network of networks such as the Internet —and/or one or more internal networks such as an Ethernet or a virtual private network (VPN). In one or more embodiments, network 127 includes a wireless network, such as a Wi-Fi network, and a cellular network. An example embodiment of the present invention utilizes a network "cloud" environment will be discussed with reference to FIGS. 6 and 7.

Referring again to FIG. 1, a hard drive interface 131 is also coupled to system bus 105. Hard drive interface 131 interfaces with a hard drive 133. In one embodiment, hard drive 133 is a non-volatile memory storing and populating a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in system memory 135 include Program for Configuring and Managing a String Database (PCMSD) 147. In some embodiments, system memory 135 can be shared and/or application programs 143 distributed across one or more software deploying servers 149 or other systems. In the example depicted, PCMSD 147 includes program instructions (software) adapted for implementing processes and/or functions in accordance with the present invention, such as (without limitation) those described with reference to FIGS. 2-8. In some embodiments, PCMSD 147 is downloaded from software deploying server 149, (on-demand or "just-in-time") e.g., where the PCMSD 147 software is not downloaded until needed for execution. In some embodiments of the present invention, software deploying server 149 can perform all (or many) of the functions associated with the present invention (including execution of PCMSD 147), thus freeing computer 101 from having to use its internal computing resources.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Spelling suggesting or detecting similar strings is a problem that, if unresolved, leads to a decrease in performance in a computer system. That is, failing to resolve the problem of identifying spelling errors leads to computer failures (or at least performance degradation) from errors in computer software coding. The inability to detect similar strings (e.g., the American term "realize" and the British equivalent "realise") leads to degraded information searching processes.

Brute character comparison of a user input string against available strings and detecting the exact match or closest match is slow, and often impractical, when very large databases are involved. For example, in a relational database such as that found in a structured query language (SQL) server, such algorithms are not scalable because character comparison against large dataset is very costly, hence not feasible.

In relational databases, one type of spelling suggestion approach involves tagging interesting parts of information. That is, the user provides either a partial or complete tag, which is searched in the relational database using a search query (i.e., a SQL-like query) to find them. There are three major limitations for this approach. First, this search technique is very much sensitive to user input error, as it assumes that user input data has an exact pattern stored in the database. Thus, a slight variation of the actual tag(s) results in no data retrieval. Second, this search technique does not perform any ranking on matched search result. Therefore, if a large number of tags are matched against a given input, then only an arbitrary sub-set of the matched results are returned to the user. This returned search result may not contain the actual information that the user is looking for. Third, this search technique needs to perform a search against all available data (strings), and thus is not scalable for a large dataset.

Thus, the present invention presents a locality sensitive hashing (LSH) technique to find a searched-for string and/or a spelling suggestion for a term found in a relational database. As described herein, the present invention generates fixed length binary codes and compares them to one another in order to find a closest match with ranking. Thus, the present invention is scalable and more efficient than existing techniques, thereby improving the operation of the computer system(s).

The present invention uses a binary locality sensitive hashing (LSH) scheme to find a set of similar strings (also referred to herein as "tags") from database with their ranks. Binary LSH approximates a similarity between two dataset by computing the hamming distance of a corresponding compact binary code. LSH is used to search for an exact or nearest neighbor in a high dimensional space, by mapping high dimensional vectors to smaller dimensions in the form of fingerprints while the similarity of the vectors in the original dimensions are preserved.

LSH hashes a long string (i.e., converts the long string into a short string, such that the long string maps to the short string), and then places hashes into "buckets" (collections of hashes) in a manner that makes it likely for similar hashes to be placed in a same bucket and dissimilar hashes to be placed in different buckets. As described herein, use of LSH leads to the generation of a summation vector for randomly generated LSH values. Once the summation vector is generated, a binary vector is generated that reflects the "state" of summed/weighted values in an LSH matrix (e.g., as represented by either "0" or "1"). This binary vector thus provides a descriptive "fingerprint" for a particular string of data, which can then be used to locate similar strings of data in a database and/or find suggested spelling alternatives for that particular string of data.

Figure 2:
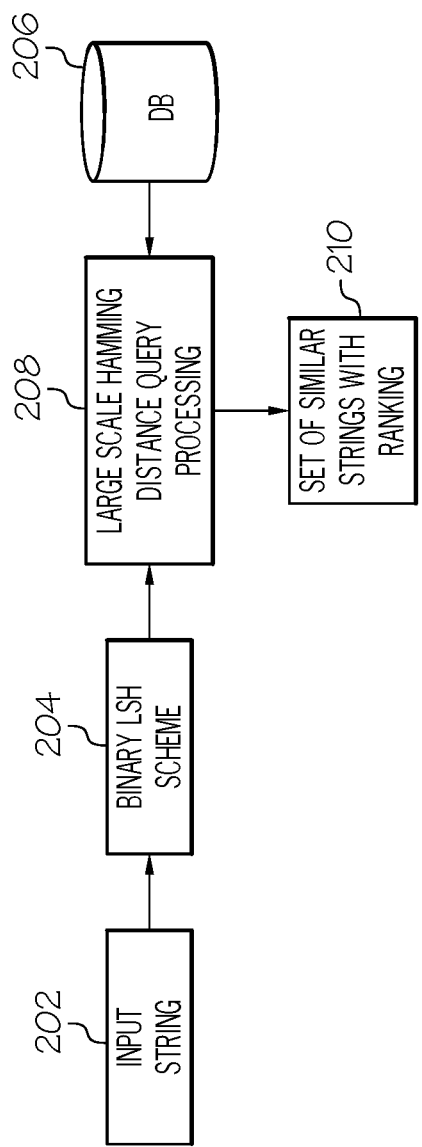
FIG. 2 illustrates an exemplary overview of the present invention.

With reference now FIG. 2, an overview of the present invention is presented. An input string (see block 202) is input into a binary LSH scheme (block 204), resulting in a binary code (i.e., a binary "fingerprint") of the input string. This binary code, along with a copy of the input string itself, is stored in a database 206. (The algorithm to generate the binary code is described below.) When a user searches for a particular string, another binary code is generated in similar fashion. This other binary code is searched against binary codes stored in the database using a large scale hamming distance query processing (see block 208), which determines how many bits are dissimilar between the two sets of binary codes. That is, if there are no bit differences between the two sets of binary codes, then there is an exact match between their underlying strings. If there are no bit similarities between the two sets of binary codes, then there is absolutely no match between their underlying strings. If there are only a "few" bit differences between the two sets of binary codes, then the two strings are deemed to be "similar", although not exactly the same. As shown in block 210, two sets of binary codes having the least hamming distance between them is the highest ranked suggestion for retrieval and/or spelling suggestions.

The present invention uses three features to calculate the LSH binary code of a string: a variation of a DICE coefficient, unique characters of the string, and a length of the string.

Figure 3:
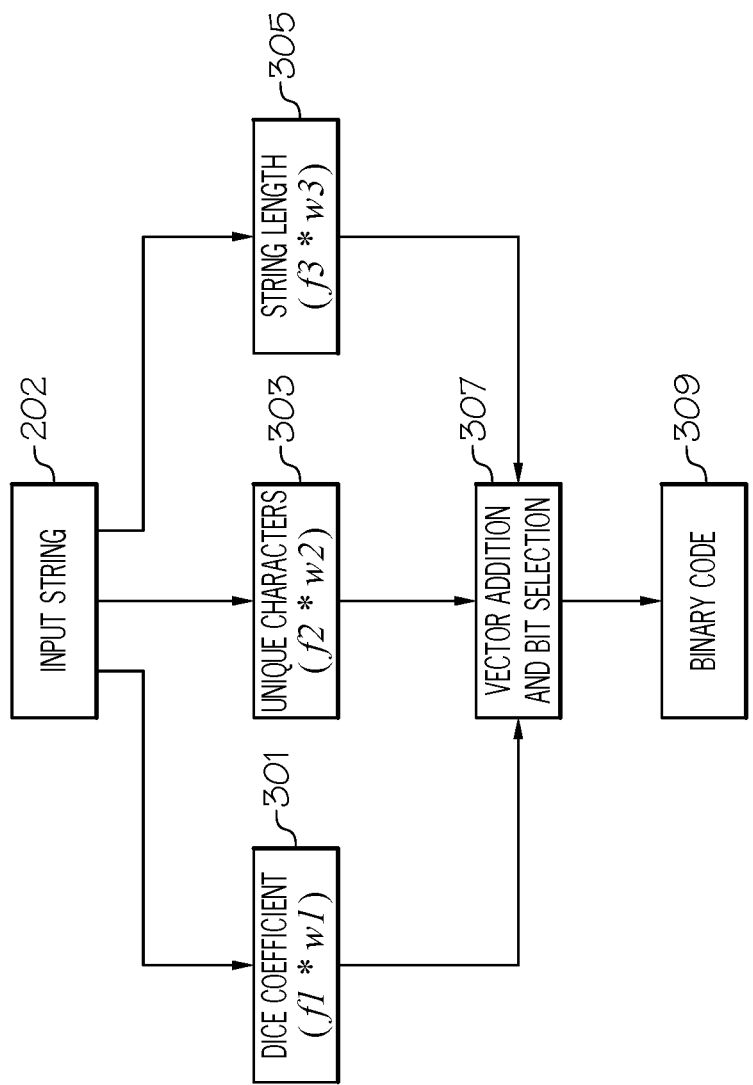
FIG. 3 depicts an exemplary overview of locality sensitive hashing (LSH) code generation in accordance with one or more embodiments of the present invention.

With reference then to FIG. 3, a given string (e.g., input string 202 introduced in FIG. 2) is represented by a binary code 309 using the weighted feature vectors for the DICE coefficient, unique characters, and length of the string. That is, each vector is assigned a weight to define the significance of a specific feature (DICE coefficient, unique characters, and/or length). A vector addition is performed on those feature vectors to generate the final bits of the LSH binary code shown in block 309.

As shown in block 301, a DICE coefficient feature (f1) is generated for k-grams (described herein as 2-grams or bi-grams) of characters in a string.

A DICE coefficient (also known as a Sørensen coefficient or a Sørensen-Dice coefficient) uses the formula of:

$$s = \frac{2|X \cap Y|}{|X| + |Y|}$$

to determine how similar two strings are. That is, the DICE (or simply "dice") coefficient s is based on X, which is a first set of bi-grams in the input string, Y is a second set of bi-grams in the input string, $|X \cap Y|$ is a quantity of intersecting bi-grams in an intersection of X and Y, $|X|$ is a quantity of bi-grams in the first set of bi-grams in the input string, and $|Y|$ is a quantity of bi-grams in the second set of bi-grams in the input string.

This DICE coefficient s is then weighted by the system, and is used to identify other bi-grams in another string.

That is, for each bi-gram of the a character sequence, the system generates a vector of n gaussian-distributed random values $N(0,1)$ of length n, where n is the LSH code length. The system maintains a fixed mapping to associate the same bi-gram hash into specific random values drawn from $N(0,1)$. To increase the sensitivity of the boundary characters, the boundary characters (i.e., the first character and the last character in the string) are repeated (i.e., "affixed"). Furthermore, any white space is removed from the input string. For example, after affixing and removing white space, the string "sql injection" would become "ssql injectionn".

Figure 4:
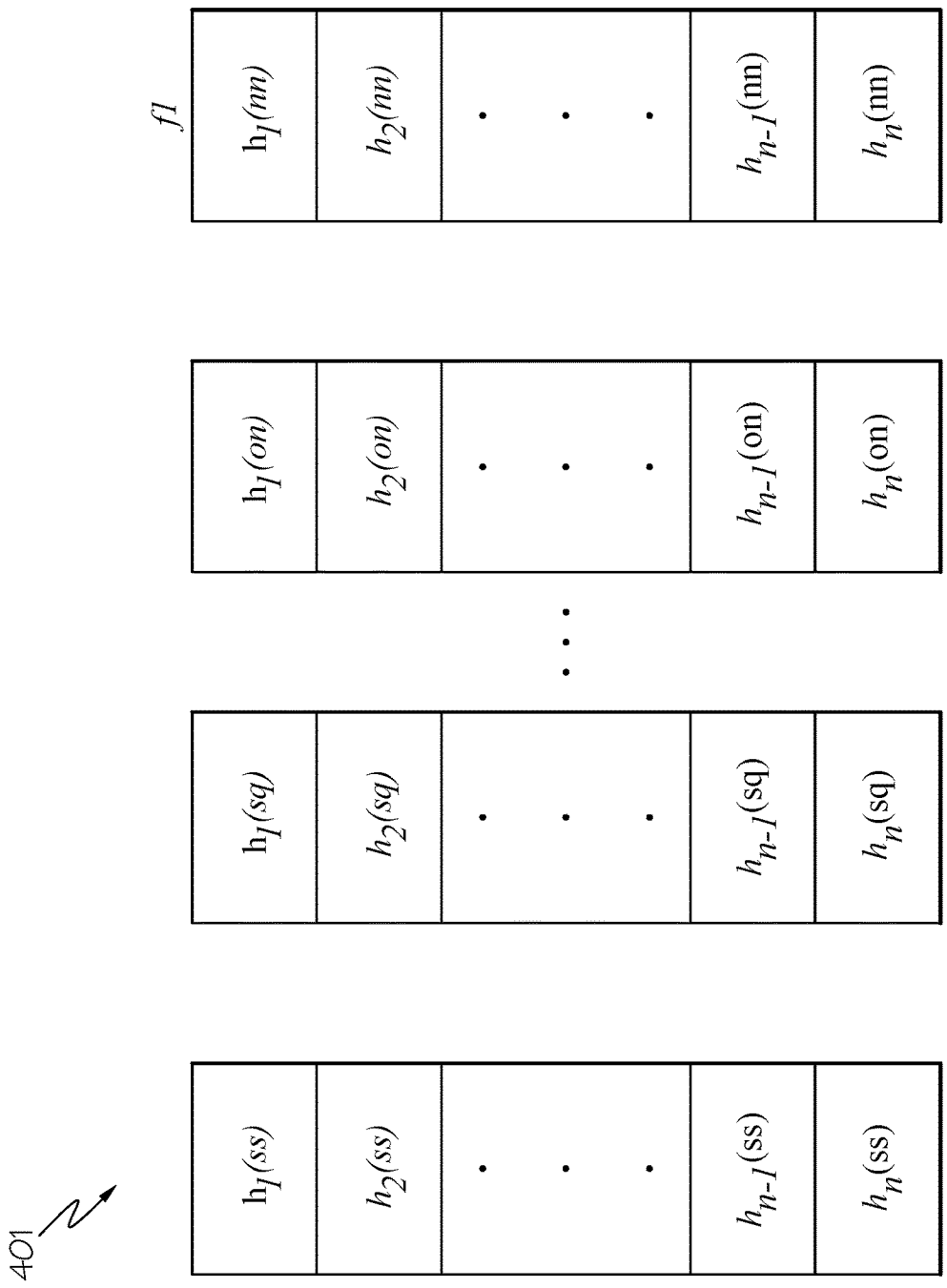
FIG. 4 illustrates a feature vector representation for a dice-coefficient of bi-grams in a string in accordance with one or more embodiments of the present invention.

Thus and as shown in FIG. 4, a vector 401 is generated for input data "sql injection" having a binary code length n. Any white spaces are trimmed and converted to lower case. Next, the system applies an affixing technique to duplicate the boundary characters. This leads to the identification of a set of bi-grams from input data {ss, sq, ql, li, in, nj, je, ec, ct, ti, io, on, nn}, which is the first feature vector (see block 301 in FIG. 3) that is used to generate the binary code.

For each bi-gram in the input data, the system generates a vector of n gaussian-distributed random values. For example, "ss" is first assigned a random value "0.3" for $h_1(ss)$, then is assigned a random value "−0.4" for $h_2(ss)$, and so on until a random value "0.7" is assigned for $h_{n-1}(ss)$ and a random value of "−0.1" is assigned for $h_n(ss)$. The system uses the same random value vector if a bi-gram is repeated. In this example, there is no repeated bi-gram.

Other random values are assigned for other bi-grams (e.g., "sq", "li", etc.) in the input string "sql injection", until the vector 401 is completed.

Figure 5:
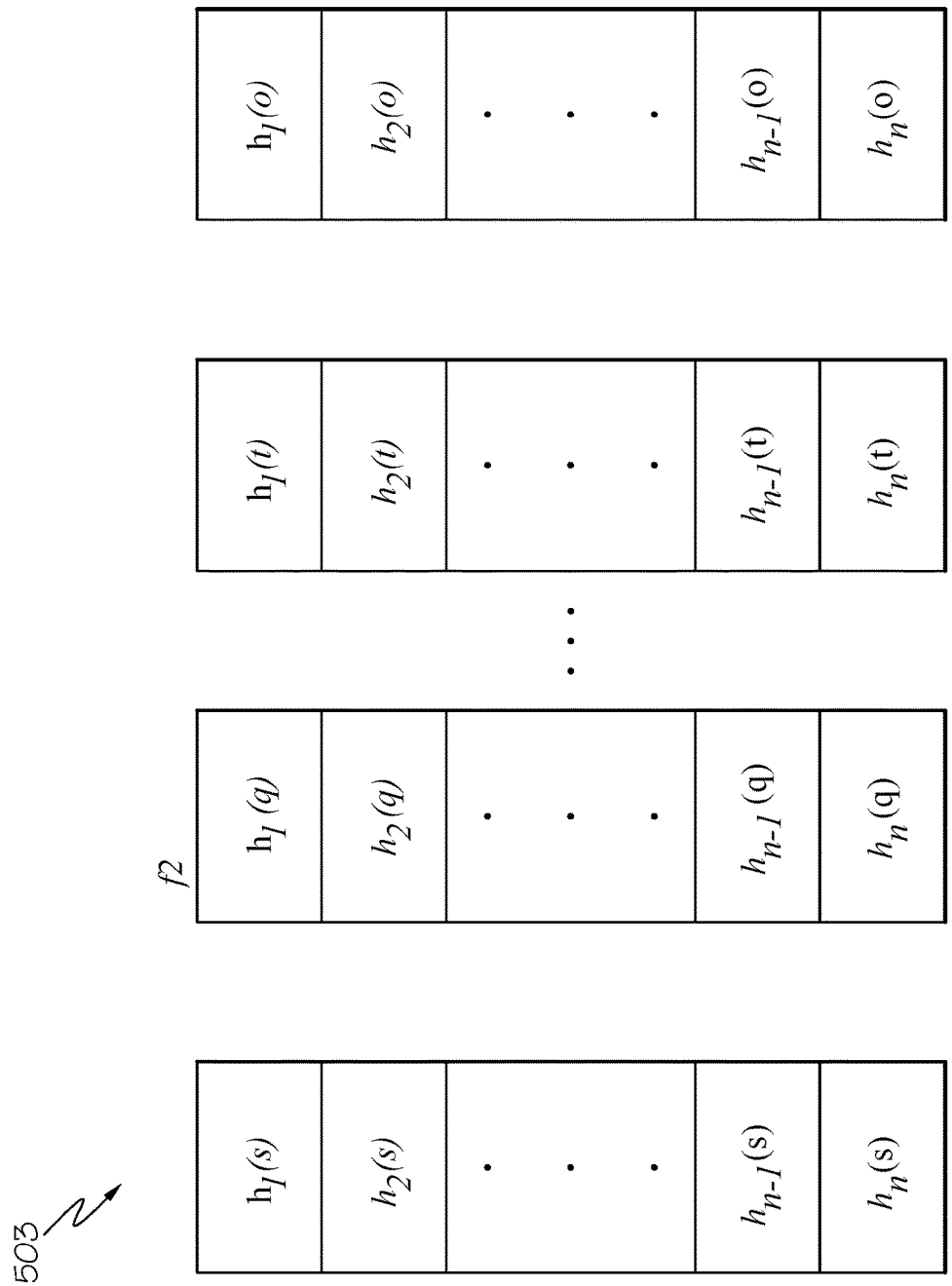
FIG. 5 depicts a feature vector representation for unique characters in a string in accordance with one or more embodiments of the present invention.

The second factor for the input string and other strings is the unique characters in the string(s), (see block 303 in FIG. 3). As shown in FIG. 5, a vector 503 is created for unique characters found in the strings.

The unique characters feature considers how many unique characters exist in a string (including the input string). When two strings share common unique characters, their similarity rank increases. For example, if a first string contains the letters a, b, c, and d, and a second string contains the letters a, b, c, and e, and a third string contains the letters b, c, e, and f, then the first string and the second string (which share three out of four unique characters) are deemed to be more similar than the first string and the third string (which share only two out of four unique characters).

Utilizing the feature of "unique characters" addresses the "low resolution" limitation of the DICE coefficient used with the bi-grams. For example, a DICE coefficient fails to detect any similarity between two strings Verelan and Virilon since they have no n-grams in common. For each unique character, the system generates a vector of n gaussian-distributed random values $N(0,1)$ of length n, where n is the LSH code length. As with the DICE algorithm, the system maintains a fixed mapping to associate the same character hash into specific random values drawn from $N(0,1)$.

For example, for the input data "sql injection", the unique characters are: s, q, l, i, n, j, e, c, t and o. FIG. 5 shows an example of this feature vector representation for a n-bit binary in vector 503. As shown in FIG. 5, each unique character in the input stream is afforded a vertical column in vector 503, and a random value is assigned to each character in each column as with the bi-gram vector 401 presented in FIG. 4.

The third factor utilized to create the binary code depicted in block 309 of FIG. 3 is the string length feature (f3) of the string(s).

When there are multiple matches of a search string, the present invention will retrieve a particular string (that matches the input string) based on closest length comparisons between the two strings. For example, assume that a database contains two strings: "sql injection" and "microsoft sql injection". If the user searches for string "sql", this feature will influence the LSH scheme described above to return the string "sql injection" with higher rank than "microsoft sql injection", since "sql" is closer in length to "sql injection" than "microsoft sql injection". To generate the feature vector to include length information, the system starts by generating a vector having n gaussian-distributed random values N(0,1), where n is the LSH code length. First, the system generates this vector for string length size having a length of 1. Next, for every incremental string length size, the system takes the vector of the previous length and randomly regenerates one of the values. That is, a vector representation of string length m and m-1 differs by one vector entry.

Thus, a length feature representation of two strings is very similar when their length is similar. The system then maintains a pool of fixed mapping to associate the same string length hash into a specific vector.

Figure 6:
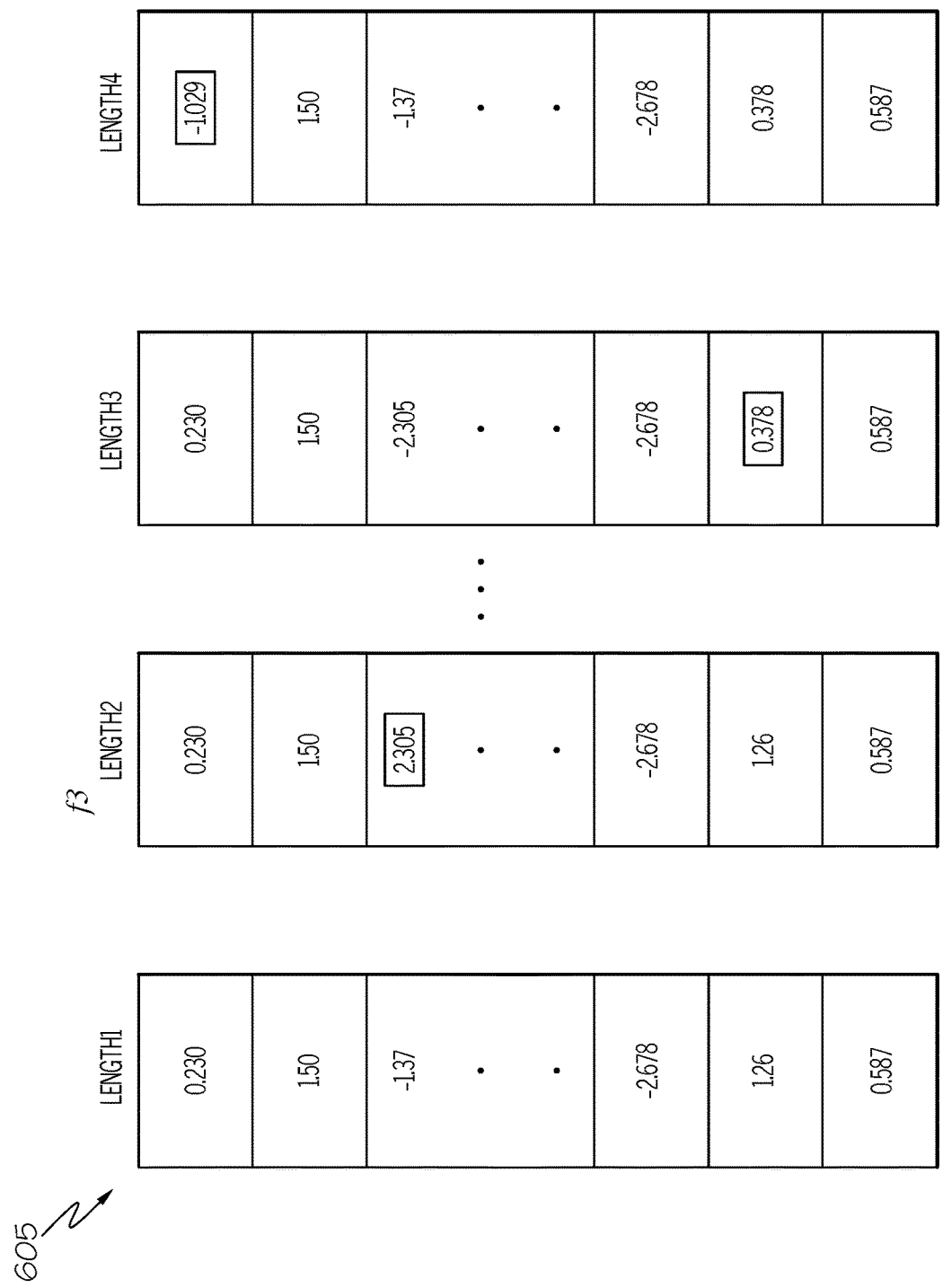
FIG. 6 illustrates a feature vector representation for string lengths of strings in accordance with one or more embodiments of the present invention.

For example, FIG. 6 shows vector 605 (associated with the string length described in block 305 in FIG. 3) representation for string length 1 to 4. As depicted, each vector representation that differs by 1 entry from its previous one as shown is highlighted. For example, the entry "−1.029" in length 4 is the first different value in the top row of cells in vector 605. Similarly, the value "2.305" in length 2 is the first cell in that row to change from the prior length. Although there is a change in length 4 from length 3 ("−1.37" instead of "−2.305"), since there has already been a change in the value, "−1.37" is not highlighted.

Figure 7:
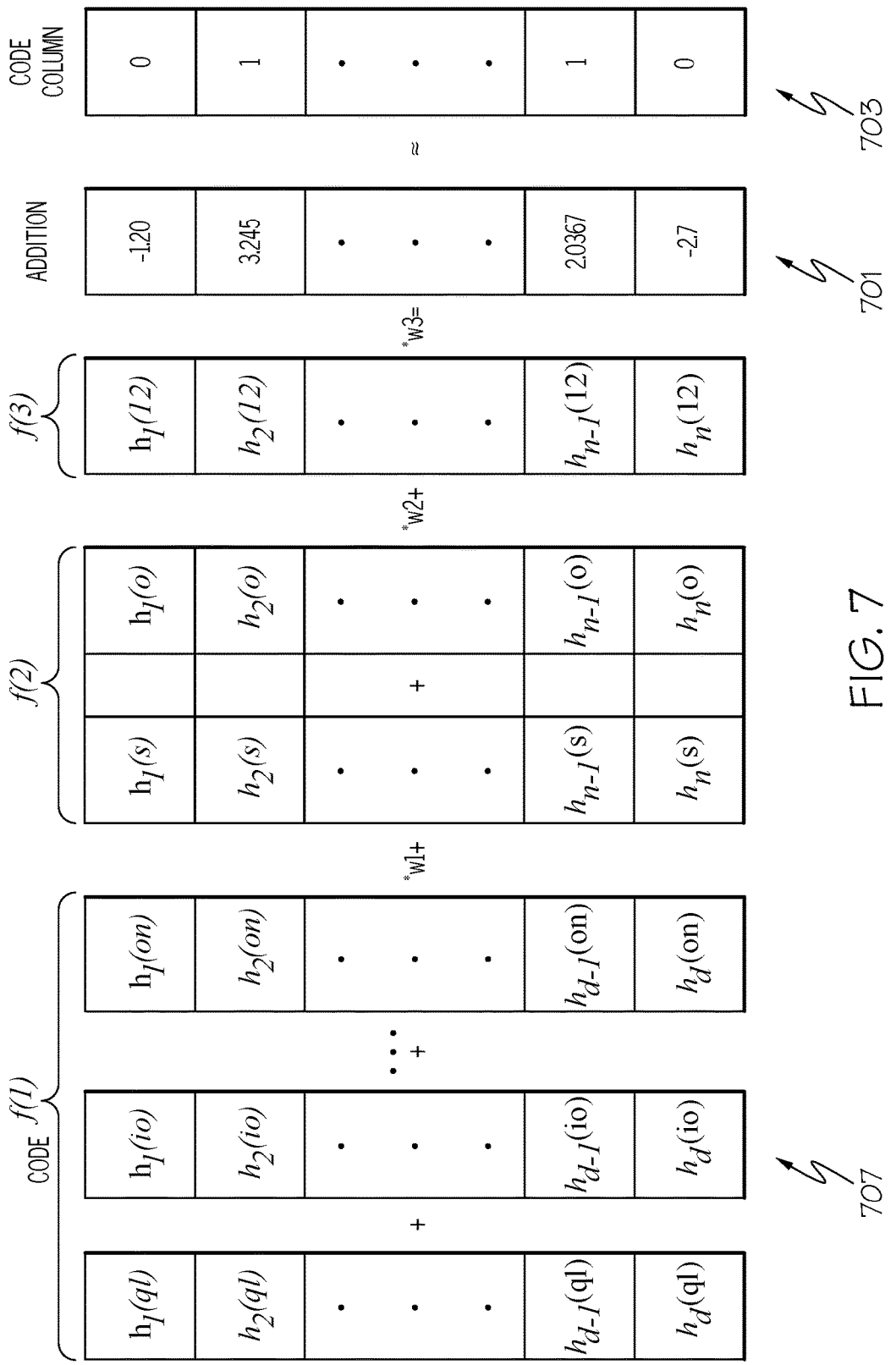
FIG. 7 depicts LSH binary code generation from feature vectors in accordance with one or more embodiments of the present invention.

Binary code generation and database query:

Once the vectors depicted in exemplary form in FIGS. 4-6, the system vector addition on them as shown in FIG. 7 as vector graph 707 (related to the operations depicted in block 307 in FIG. 3). That is, each of the vectors for f(1), f(2), and f(3) are horizontally summed after their respective weights w1, w2, and w3 have been applied to create the addition column 701 shown in FIG. In order to determine an importance of each of the features in a final similarity calculation, a different weight can be assigned to each feature. In one or more embodiments, these weights w1, w2, and w3 are based on historical runs. That is various weights are applied to the different vectors. The combination of weights that results in the closest matches between a known string and a newly received string is then used.

Thus, as shown in FIG. 7, w1 is the weight assigned to f(1), w2 is assigned to f(2) and w3 is assigned to f(3). For example, the weight of f(1) can be set to a greater value than that of the weight f(3) in order to impose a greater significance for bi-gram similarities over length similarities. The actual values of w1, w2, and w3 can be specified by the application.

The sign of the vector component found in addition column 701 determines the bit in the final LSH binary key shown in code column 703. That is, any entry in addition column 701 that is a negative number causes a "0" to be entered in the related entry in the code column 703, while any entry in addition column 701 that is a positive number causes a "1" to be entered in the related entry in the code column 703. Thus, the code column 703 as depicted in FIG. 7 reads "01 . . . 10".

When a new string (or tag) is added as an input to the application (e.g., PCMSD 147 shown in FIG. 1), its binary code is stored in a database. When a user performs a search, a corresponding code is generated and a database query is performed to find the minimum hamming distance code.

Figure 8:
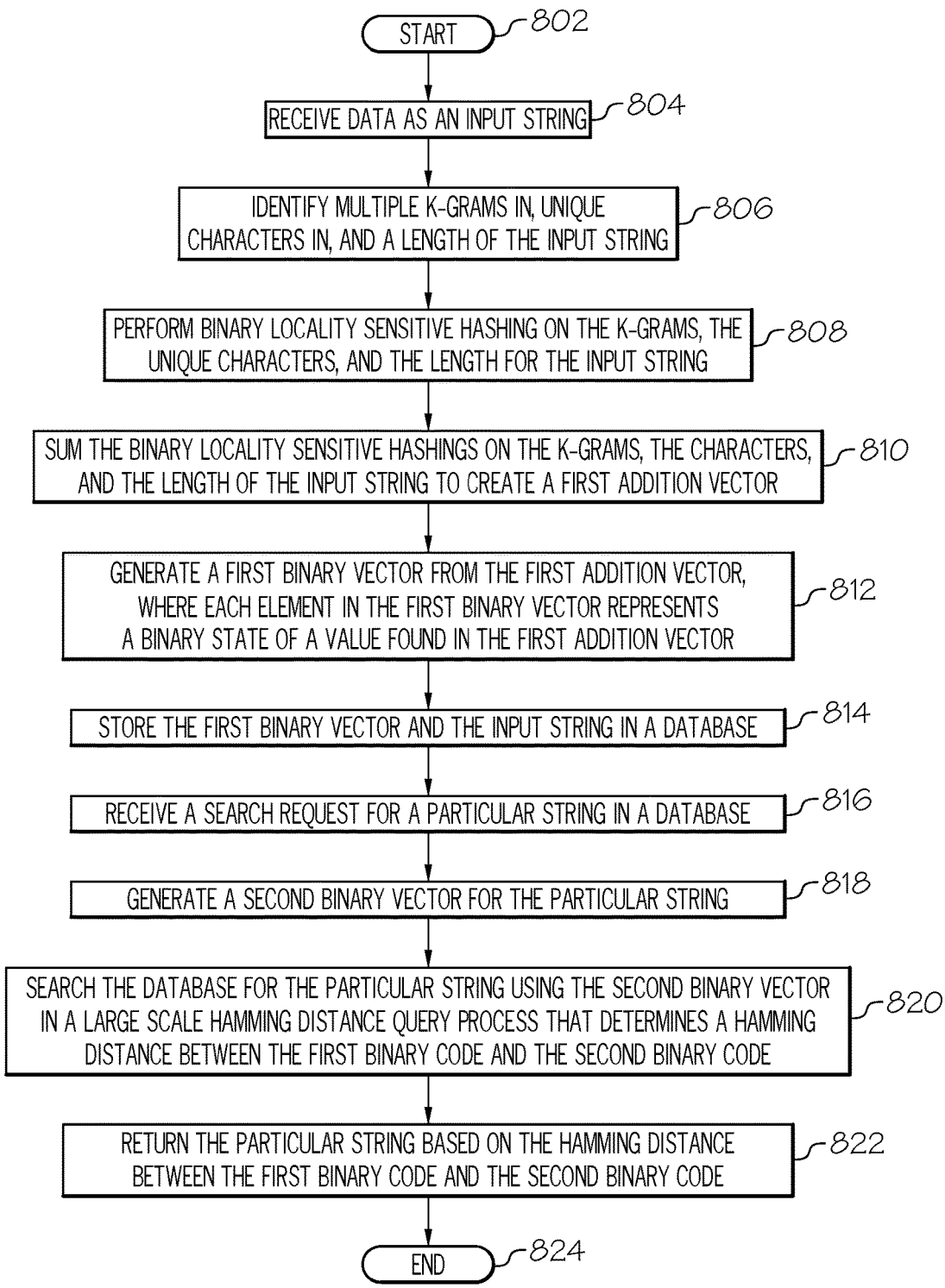
FIG. 8 depicts an exemplary method in accordance with one or more embodiments of the present invention.

With reference now to FIG. 8, an exemplary method in accordance with one or more embodiments of the present invention is depicted.

After initiator block 802, one or more processors receive data as an input string, as described in block 804.

As described in block 806, one or more processors then identify multiple k-grams in the input string (where each k-gram is a string of one or more characters in the input string); unique characters in the input string; and a length of the input string.

As described in block 808, one or more processors then perform binary locality sensitive hashing on the k-grams in, the unique characters in, and the length of the input string.

As described in block 810, one or more processors then sum the binary locality sensitive hashings on the k-grams, the unique characters, and the length of the input string to create a first addition vector.

As described in block 812, one or more processors then generate a first binary vector from the first addition vector, where each element in the first binary vector represents a binary state of a value found in the first addition vector.

As described in block 814, one or more processors then store the first binary vector and the input string in a database, such that the first binary vector and the input string are associated with each other for indexing and retrieval purposes.

As described in block 816, one or more processors subsequently receive a search request for a particular string in a database.

As described in block 818, one or more processors generate a second binary vector for the particular string by: identifying multiple k-grams in the particular string; identifying unique characters in the particular string; identifying a length of the particular string; performing binary locality sensitive hashing on the k-grams, the unique characters, and the length for the particular string; summing the binary locality sensitive hashings on the k-grams, the unique characters, and the length of the particular string to create a second addition vector; and then generating the second binary vector from the second addition vector, such that each element in the second binary vector represents a binary state of a value found in the second addition vector.

As described in block 820, one or more processors search the database for the particular string using the second binary vector in a large scale hamming distance query process that determines a hamming distance between the first binary code and the second binary code. That is, the particular string that has a binary vector that is closest in hamming distance to the binary vector for the input string is selected as the desired particular string.

As described in block 822, one or more processors return the particular string based on the hamming distance between the first binary code and the second binary code. That is, the closest binary code to the first binary code is associated with the requested particular string, and is thus returned.

The flow chart ends at terminator block 824.

In an embodiment of the present invention, one or more processors generate a unique binary vector from an addition vector for each string in the database, where each element in each unique binary vector represents a binary state of a value found in the addition vector for each string in the database. One or more processors then establish (determine) a hamming distance between each unique vector and the first binary vector. One or more processors rank each unique vector according to its respective hamming distance from the first addition vector to create a ranked set of strings in the database, and then present the ranked set of strings in response to receiving the search request for the particular string in the database. That is, multiple strings are identified along with their binary vectors (which are created using the processes described herein). The "best fit" string (i.e., having the binary vector that is closest in hamming distances to the binary vector for the input string) is thus returned to the requester.

In an embodiment of the present invention, one or more processors receive a user input of a variation of the input string, and then return a highest ranked string from the ranked set of strings.

The variation of the input string may be the result of a misspelling of the input string (and thus a misspelling of the requested string), or else an accepted alternative spelling of the input string.

In an embodiment of the present invention, the binary locality sensitive hashing on the k-grams is derived from a dice coefficient s, where:

$$s = \frac{2|X \cap Y|}{|X| + |Y|}$$

where X is a first set of bi-grams in the input string, where Y is a second set of bi-grams in the input string, wherein |X∩Y| is a quantity of intersecting bi-grams in an intersection of X and Y, wherein |X| is a quantity of bi-grams in the first set of bi-grams in the input string, and wherein |Y| is a quantity of bi-grams in the second set of bi-grams in the input string.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
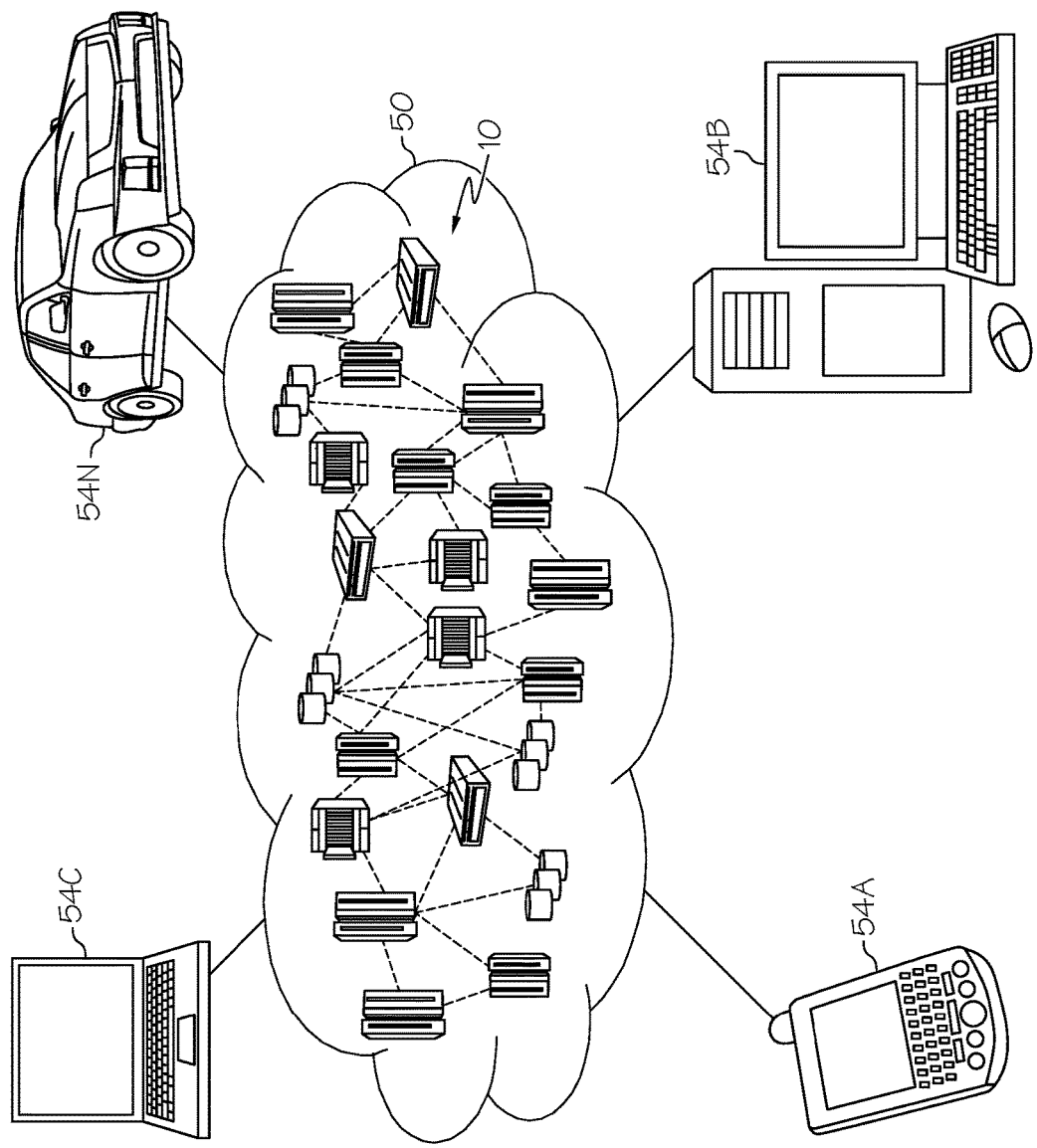
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
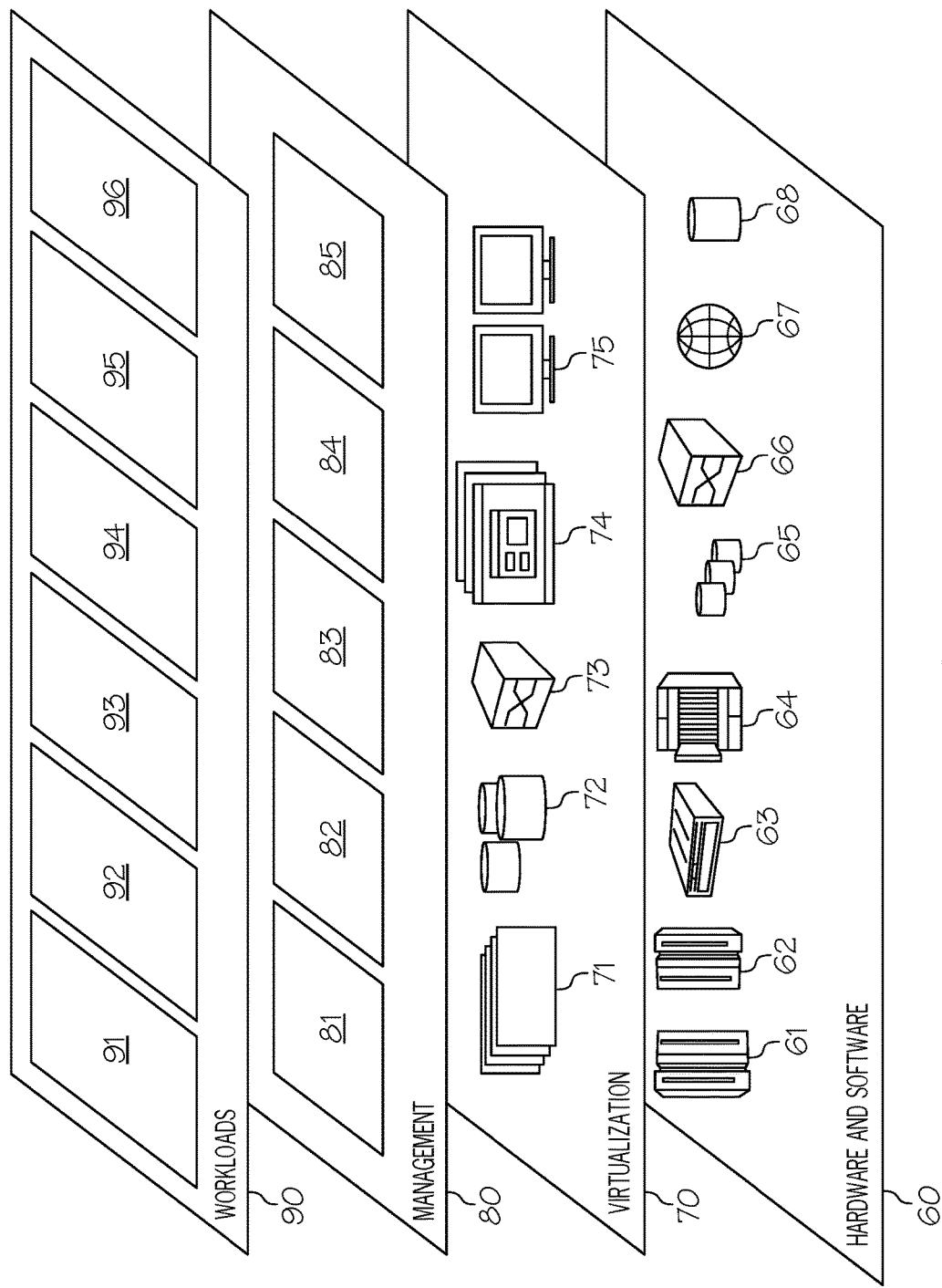
FIG. 10 depicts abstraction model layers of a cloud computing environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database string processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
receiving, by one or more processors, data as an input string;
generating, by one or more processors, a first binary code using a binary locality sensitive hashing of k-grams in the input string, wherein features used to generate the first binary code comprise a similarity coefficient of strings of characters in the input string, unique characters of the input string, and a length of the input string, wherein the binary locality sensitive hashing on the k-grams in the input string is derived from a dice coefficient s, wherein:

$$s = \frac{2|X \cap Y|}{|X|+|Y|}$$

wherein X is a first set of bi-grams in the input string, wherein Y is a second set of bi-grams in the input string, wherein |X∩Y| is a quantity of intersecting bi-grams in an intersection of X and Y, wherein |X| is a quantity of bi-grams in the first set of bi-grams in the input string, and wherein |Y| is a quantity of bi-grams in the second set of bi-grams in the input string;

storing, by one or more processors, the first binary code and the input string in a database;

in response to receiving a search request for a particular string, generating, by one or more processors, a second binary code using a binary locality sensitive hashing on the particular string;

searching, by one or more processors, the database using the second binary code in a large scale hamming distance query process; and ranking and returning, by one or more processors, a set of similar strings, wherein strings with a minimum hamming distance between the first binary code and second binary code are a highest ranked recommendation.

2. The computer-implemented method of claim 1, further comprising:

identifying, by one or more processors, multiple k-grams in the input string, wherein each k-gram is a string of one or more characters in the input string;

identifying, by one or more processors, the unique characters in the input string;

identifying, by one or more processors, the length of the input string;

performing, by one or more processors, binary locality sensitive hashing on the k-grams, the unique characters, and the length of the input string;

summing, by one or more processors, binary locality sensitive hashings on the k-grams, the unique characters, and the length of the input string to create a first addition vector;

generating, by one or more processors, a first binary vector from the first addition vector, wherein each element in the first binary vector represents a binary state of a value found in the first addition vector;

storing, by one or more processors, the first binary vector and the input string in a database;

receiving, by one or more processors, the search request for the particular string in the database;

identifying, by one or more processors, multiple k-grams in the particular string;

identifying, by one or more processors, unique characters in the particular string;

identifying, by one or more processors, a length of the particular string;

performing, by one or more processors, binary locality sensitive hashing on the k-grams, the unique characters, and the length for the particular string;

summing, by one or more processors, binary locality sensitive hashings on the k-grams, the unique characters, and the length of the particular string to create a second addition vector;

generating, by one or more processors, a second binary vector from the second addition vector, wherein each element in the second binary vector represents a binary state of a value found in the second addition vector;

searching, by one or more processors, the database for the particular string using the second binary vector in a large scale hamming distance query process that determines a hamming distance between the first binary code and the second binary code; and returning, by one or more processors, the particular string based on the hamming distance between the first binary code and the second binary code.

3. The computer-implemented method of claim 2, further comprising:

generating, by one or more processors, a unique binary vector from an addition vector for each string in the database, wherein each element in each unique binary vector represents a binary state of a value found in the addition vector for each string in the database;

establishing, by one or more processors, a hamming distance between each unique binary vector and the first binary vector;

ranking, by one or more processors, each unique binary vector according to its respective hamming distance from the first addition vector to create a ranked set of strings in the database; and presenting, by one or more processors, the ranked set of strings in response to receiving the search request for the particular string in the database.

4. The computer-implemented method of claim 3, further comprising:

receiving, by one or more processors, a user input of a variation of the input string; and in response to receiving the user input of the variation of the input string, returning, by one or more processors, a highest ranked string from the ranked set of strings.

5. The computer-implemented method of claim 4, wherein the variation of the input string is a misspelling of the input string.

6. The computer-implemented method of claim 4, wherein the variation of the input string is an accepted alternative spelling of the input string.

7. A computer program product for searching a database for a particular string, the computer program product comprising a non-transitory computer readable storage medium having program instructions embodied therewith, the program instructions readable and executable by a computer to perform a method of:

receiving data as an input string;

generating a first binary code using a binary locality sensitive hashing of k-grams in the input string, wherein features used to generate the first binary code comprise a similarity coefficient of strings of characters in the input string, unique characters of the input string, and a length of the input string, wherein the binary locality sensitive hashing on the k-grams in the input string is derived from a dice coefficient s, wherein:

$$s = \frac{2|X \cap Y|}{|X|+|Y|}$$

wherein X is a first set of bi-grams in the input string, wherein Y is a second set of bi-grams in the input string, wherein |X∩Y| is a quantity of intersecting bi-grams in an intersection of X and Y, wherein |X| is a quantity of bi-grams in the first set of bi-grams in the input string, and wherein |Y| is a quantity of bi-grams in the second set of bi-grams in the input string;

storing the first binary code and the input string in a database;

in response to receiving a search request for a particular string, generating a second binary code using the binary locality sensitive hashing on the particular string;

searching the database using the second binary code in a large scale hamming distance query process; and ranking and returning a set of similar strings, wherein strings with a minimum hamming distance between the first binary code and second binary code are a highest ranked recommendation.

8. The computer program product of claim 7, wherein the method further comprises:

identifying multiple k-grams in the input string, wherein each k-gram is a string of one or more characters in the input string;

identifying the unique characters in the input string;

identifying the length of the input string;

performing binary locality sensitive hashing on the k-grams, the unique characters, and the length of the input string;

summing binary locality sensitive hashings on the k-grams, the unique characters, and the length of the input string to create a first addition vector;

generating a first binary vector from the first addition vector, wherein each element in the first binary vector represents a binary state of a value found in the first addition vector;

storing the first binary vector and the input string in a database;

receiving a search request for a particular string in the database;

identifying multiple k-grams in the particular string;

identifying unique characters in the particular string;

identifying a length of the particular string;

performing binary locality sensitive hashing on the k-grams, the unique characters, and the length for the particular string;

summing binary locality sensitive hashings on the k-grams, the unique characters, and the length of the particular string to create a second addition vector;

generating a second binary vector from the second addition vector, wherein each element in the second binary vector represents a binary state of a value found in the second addition vector;

searching the database for the particular string using the second binary vector in a large scale hamming distance query process that determines a hamming distance between the first binary code and the second binary code; and returning the particular string based on the hamming distance between the first binary code and the second binary code.

9. The computer program product of claim 8, wherein the method further comprises:

generating a unique binary vector from an addition vector for each string in the database, wherein each element in each unique binary vector represents a binary state of a value found in the addition vector for each string in the database;

establishing a hamming distance between each unique binary vector and the first binary vector;

ranking each unique binary vector according to its respective hamming distance from the first addition vector to create a ranked set of strings in the database; and presenting the ranked set of strings in response to receiving the search request for the particular string in the database.

10. The computer program product of claim 9, wherein the method further comprises:

receiving a user input of a variation of the input string; and in response to receiving the user input of the variation of the input string, returning a highest ranked string from the ranked set of strings.

11. The computer program product of claim 10, wherein the variation of the input string is a misspelling of the input string.

12. The computer program product of claim 10, wherein the variation of the input string is an accepted alternative spelling of the input string.

13. The computer program product of claim 9, wherein the program instructions are provided as a service in a cloud environment.

14. A computer system comprising:

one or more processors;

one or more computer readable memories, operably coupled to the one or more processors, wherein the one or more computer readable memories store program instructions for execution by at least one of the one or more processors, the stored program instructions comprising:

program instructions to receive data as an input string;

program instructions to generate a first binary code using a binary locality sensitive hashing of k-grams in the input string, wherein features used to generate the first binary code comprise a similarity coefficient of strings of characters in the input string, unique characters of the input string, and a length of the input string, wherein the binary locality sensitive hashing on the k-grams in the input string is derived from a dice coefficient s, wherein:

$$s = \frac{2|X \cap Y|}{|X| + |Y|}$$

wherein X is a first set of bi-grams in the input string, wherein Y is a second set of bi-grams in the input string, wherein $|X \cap Y|$ is a quantity of intersecting bi-grams in an intersection of X and Y, wherein $|X|$ is a quantity of bi-grams in the first set of bi-grams in the input string, and wherein $|Y|$ is a quantity of bi-grams in the second set of bi-grams in the input string;

program instructions to store the first binary code and the input string in a database;

program instructions to, in response to receiving a search request for a particular string, generate a second binary code using the binary locality sensitive hashing on the particular string;

program instructions to search the database using the second binary code in a large scale hamming distance query process; and program instructions to rank and return a set of similar strings, wherein strings with a minimum hamming distance between the first binary code and second binary code are a highest ranked recommendation.

15. The computer system of claim 14, further comprising:

program instructions to identify multiple k-grams in the input string, wherein each k-gram is a string of one or more characters in the input string;

program instructions to identify the unique characters in the input string;

program instructions to identify the length of the input string;

program instructions to perform binary locality sensitive hashing on the k-grams, the unique characters, and the length for the input string;

program instructions to sum binary locality sensitive hashings on the k-grams, the unique characters, and the length of the input string to create a first addition vector;

program instructions to generate a first binary vector from the first addition vector, wherein each element in the first binary vector represents a binary state of a value found in the first addition vector;

program instructions to store the first binary vector and the input string in a database;

program instructions to receive a search request for a particular string in a database;

program instructions to identify multiple k-grams in the particular string;

program instructions to identify unique characters in the particular string;

program instructions to identify a length of the particular string;

program instructions to perform binary locality sensitive hashing on the k-grams, the unique characters, and the length for the particular string;

program instructions to sum binary locality sensitive hashings on the k-grams, the unique characters, and the length of the particular string to create a second addition vector;

program instructions to generate a second binary vector from the second addition vector, wherein each element in the second binary vector represents a binary state of a value found in the second addition vector;

program instructions to search the database for the particular string using the second binary vector in a large scale hamming distance query process that determines a hamming distance between the first binary code and the second binary code; and program instructions to return the particular string based on the hamming distance between the first binary code and the second binary code.

16. The computer system of claim 15, further comprising:

program instructions to generate a unique binary vector from an addition vector for each string in the database, wherein each element in each unique binary vector represents a binary state of a value found in the addition vector for each string in the database;

program instructions to establish a hamming distance between each unique binary vector and the first binary vector;

program instructions to rank each unique binary vector according to its respective hamming distance from the first addition vector to create a ranked set of strings in the database; and program instructions to present the ranked set of strings in response to receiving the search request for the particular string in the database.

17. The computer system of claim 14, wherein the stored program instructions are provided as a service in a cloud environment.

* * * * *